United States Patent [19]

Bellows et al.

[11] Patent Number: 4,766,045
[45] Date of Patent: Aug. 23, 1988

[54] METAL HALOGEN ELECTROCHEMICAL CELL

[75] Inventors: Richard J. Bellows, Hampton; Edward Kantner, E. Brunswick, both of N.J.

[73] Assignee: Exxon Research and Engineering Company, Florham Park, N.J.

[21] Appl. No.: 45,377

[22] Filed: May 4, 1987

Related U.S. Application Data

[63] Continuation of Ser. No. 835,334, Mar. 3, 1986, abandoned.

[51] Int. Cl.⁴ .................. H01M 10/36; H01M 2/14
[52] U.S. Cl. .................. 429/105; 429/199; 429/252; 429/198
[58] Field of Search ........... 429/101, 105, 199, 252, 429/248, 15, 50, 198, 13

[56] References Cited

U.S. PATENT DOCUMENTS

| 4,049,886 | 9/1977 | Will | 429/105 |
| 4,105,829 | 8/1978 | Venero | 429/101 X |
| 4,162,351 | 7/1979 | Putt et al. | 429/101 X |
| 4,218,521 | 8/1980 | Putt et al. | 429/101 X |
| 4,592,971 | 6/1986 | Walsh | 429/198 X |

Primary Examiner—Anthony Skapars
Attorney, Agent, or Firm—Joseph J. Dvorak

[57] ABSTRACT

It has now been discovered that reduction in the coulombic efficiency of metal halogen cells can be minimized if the microporous separator employed in such cells is selected from one which is preferably wet by the aqueous electrolyte and is not wet substantially by the cathodic halogen.

6 Claims, 2 Drawing Sheets

METAL HALOGEN ELECTROCHEMICAL CELL

The Government of the United States of America has rights in the invention pursuant to Contract Agreement No. 16-3187 entered into with Sandia National Laboratories on behalf of the United States Department of Energy.

This is a continuation of application Ser. No. 835,334, filed Mar. 3, 1986, now abandoned.

BACKGROUND OF THE INVENTION

1. Field of the Invention

This invention relates to metal halogen electrochemical cells, especially batteries, and more particularly to metal halogen cells which employ microporous separators to define anolyte and catholyte compartments within the cell.

2. The Prior Art

The art is replete with examples of electrochemical cells employing separators to divide the cells into anolyte and catholyte compartments. Mention of a few representative examples of such art is set forth below.

U.S. Pat. No. 3,773,560 discloses use of a membrane or diaphragm separator to divide a zinc chloride electrochemical cell into two zones or compartments.

U.S. Pat. No. 4,049,886 dicloses a zinc-bromine or zinc-iodine electrochemical cell which employs a microporous separator and to divide the cell into anolyte and catholyte compartments.

U.S. Pat. No. 4,105,829 discloses a metal bromine cell, especially a zinc bromine cell, which employs a bromine complexing agent in the electrolyte and which forms a water immiscible liquid with cathodic bromine. Also disclosed is the use of a separator to divide the cell into an anolyte and catholyte compartment.

Among other things, the separator in such cells serves to prevent contact of the metal anode with the counterelectrode. It also helps reduce contact of the metal anode with cathodic halogen during charging of the cell which, of course, results in auto discharge of the cell.

SUMMARY OF THE INVENTION

It has now been discovered that reduction in the coulombic efficiency of metal halogen cells can be minimized if the microporous separator employed in such cells is selected from one which is preferably wet by the aqueous electrolyte and is not wet substantially by the cathodic halogen.

Thus, in one embodiment of the present invention, there is provided a metal-halogen electrochemical cell comprising an electrode structure on which the metal, especially zinc or cadmium, is deposited during charging of the cell. A counterelectrode is provided at which to generate cathodic halogen, e.g., bromine, during charging of the cell. The cell includes an aqueous metal halide solution as electrolyte, the metal being the same as the metal of the anode and the halide being the same as the cathodic halogen. Included in the electrolyte is a water soluble complexing agent capable of forming a water immiscible complex with the cathodic halogen. The cell is divided into an anolyte and catholyte compartments by a microporous separator which is selected from separators which are preferentially wet by the aqueous electrolyte and not wet substantially by the water immiscible complex of cathodic halogen.

These and other embodiments of the present invention will become more apparent upon the reading of the detailed description in conjunction with the drawings.

DETAILED DESCRIPTION OF THE INVENTION

In the description which follows, for convenience, the metal of the metal halogen couple will be referred to as the anode and the halogen as the cathode. It will be appreciated, however, that the metal halogen cell is a secondary cell and consequently the halogen acts as a cathode on discharge and as an anode on charging. Similarly, the metal of the couple acts as an anode on discharge of the cell and as a cathode on its charging.

Figure 1:
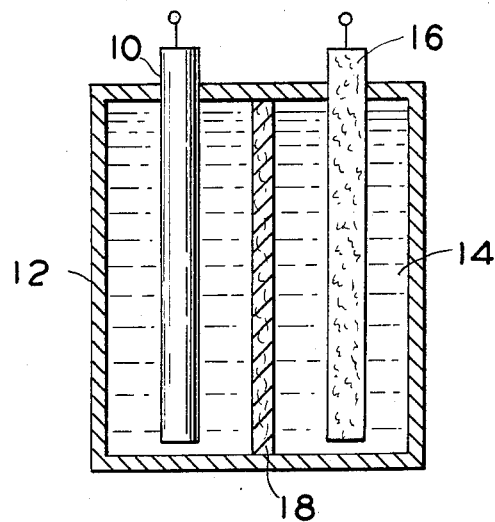
FIG. 1 is a cross-sectional view of one cell in accordance with the present invention.

Turning now to FIG. 1, there is shown in one embodiment of the cell of the present invention. As is illustrated in FIG. 1, the electrochemical cell of the present invention comprises a metal anode 10 disposed in a container 12 containing aqueous electrolyte 14. Spaced apart from the metal anode 10 is a chemically inert electrode 16. Inert electrode 16 is disposed within container 12 so as to be in contact with aqueous electrolyte 14.

The metal anode 10, in accordance with the present invention, preferably is selected from zinc and cadmium. It should be noted, however, that it is not absolutely essential that the metal anode 10 be formed solely by the anode active metal. Indeed, inert wire mesh or various forms of porous carbon materials upon which the anode-active metal, such as zinc or cadmium, may be plated are suitable materials for forming an electrode structure on which the anode active material can be deposited.

Similarly, a wide range of inert materials can be used for the fabricating electrode 16, such as various forms of electroconductive and non-corrosive materials, including porous carbon, graphite and carbon felt. Indeed, the inert electrode 16 preferably is formed of a highly porous material which will absorb the cathodically active halogen of the cell. One suitable, chemically inert, porous, electrically conductive material for forming electrode 16 for the practice of the present invention is a carbon felt, such as UCAR grade, VDF carbon felt sold by Union Carbide Corporation, Carbon Products Division, 270 Park Avenue, New York, N.Y.

The electrolyte of the cell of the present invention in an aqueous metal halide solution in which the metal of the metal halide correponds to the metal of the anode. Thus, when zinc is the anode-active material, then zinc halide is used. Similarly, the halide of the metal halide electrolyte has the same halide as the cathode-active halogen material. Thus, for example, when the cathodic halogen is bromine, then the metal halide used is a metal bromide.

Since the preferred electrochemical cell of the present invention is a zinc bromine cell, specific reference will be made hereinafter to such zinc bromine cells and batteries. Nonetheless, it should be appreciated that such specific reference is not intended to be limiting but is made solely for convenience in describing the invention.

Turning to the concentration of the zinc bromide in the aqueous electrolyte, it is worth noting that such concentration is not critical and a wide range of concentrations may be employed depending, for example, on the desired energy density of the cell. Typically the molarity of the zinc bromide solution will be in the range of about 2.5 to 3.5 molar, although the concentration can be as low as 0.5 molar and as high as 6.0 molar and higher.

Optionally and preferably, other salts, such as zinc sulfate, may be added to the electrolyte to improve electrolyte conductivity and/or zinc plating characteristics. The effects of such additives are well known and form no part of the present invention.

As indicated hereinbefore, the cathode-active material of the present invention is a halogen, and preferably bromine.

Additionally, the cathode-active material may be present as a substantially water immiscible liquid halogen complex of an asymmetric, i.e., it does not have an axis of symmetry in the molecule, tetra organo substituted ammonium salt. The asymmetric tetra organo substituted ammonium salts suitable in the practice of the present invention are defined by the following characteristics. First, the tetra organo substituted ammonium salt must be soluble in aqueous electrolyte, especially 2.5 to 3.5 molar zinc bromide solution and secondly it must be one which is capable of combining with cathodic bromine. Third, the halogen complex must be substantially water immiscible liquid over a temperature range of from about 10° C. to about 60° C. and at least between 13° C. to 30° C. The tetra organo substituted ammonium salts typically useful in the practice of the present invention have the following general structure:

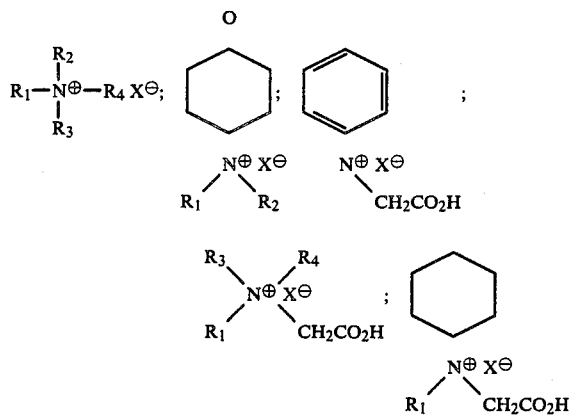

wherein $R_1$, $R_2$, $R_3$ and $R_4$ are different alkyl groups or haloalkyl groups of from about 1 to 8 carbon atoms and $X^-$ is selected from $Cl^-$, $Br^-$ and $I^-$.

As indicated, hereinbefore, the chief characteristic of the complexing agents preferred in the practice of the present invention is that they form water immiscible liquid polyhalide type compounds with molecular halogen.

As is known, some quaternary ammonium salts form solid quaternary ammonium polyhalides which by use of suitable aprotic solvents form halogen complexes that are substantially water immiscible and are liquid at about 10° to about 60° C. Examples of suitable organic complexing solvents are propylene carbonate, dimethylcarbonate, triethylphosphate, dimethylsulfate, sulfolane, 1,4 butane sulfane and the like. These halogen complexing agents are also suitable in the practice of the present invention.

In those instances where the quaternary ammonium compounds form a substantially water insoluble liquid phase with halogen, relatively small amounts of the foregoing solvents can nonetheless be added to increase the fluidity of the halogen-containing water insoluble liquid phase.

Returning to FIG. 1, the cell shown is provided with a separator 18 which prevents internal shorting that might otherwise occur if during charging of the cell sufficient zinc dendrites formed so as to be able to bridge the gap between the anode 10 and the counterelectrode 16. Separator 18 also serves the function of preventing contact of the metal anode with the cathodic-active material during charging of the cell.

In the practice of the present invention, it is particularly important that separator 18 is selected from microporous substances which are preferentially wet by aqueous electrolyte solutions, but which are substantially not wet by cathodic halogen and/or cathodic halogen complexes present in such electrolytes when the cell is in a charged state.

The extent of wetting of a given separator can be determined by immersing the separator in a container having both the aqueous electrolyte and the liquid halogen and/or halogen complex therein and so that the separator is in contact with electrolyte and halogen and/or halogen complex thereafter determining the amount of halogen and/or halogen complex taken up by the separator material. Indeed, the extent of wetting of the separator material generally can be visually observed. For example, the polybromide complexes formed between bromine and tetraorgano ammonium salts referred to above form a red water immiscible second phase. If a clear glass container is charged with aqueous electrolyte and a polybromide complex, for example, in the volume ratio of about 3 to 1 respectively, a clear line of demarcation can be observed between the two liquids, with the aqueous phase forming an upper layer and the polybromide forming a lower layer. If a separator material is then vertically suspended in the container so as to be in contact with the liquids, the coloration of the polybromide will be observed in the separator extending up into the aqueous electrolyte if wetted by the polybromide; however, if the separator material is one which is preferentially wet by electrolyte, then the coloration of the polybromide is not seen in the separator extending into the electrolyte. The extent of wettability or non-wettability of the separator material can, of course, be determined by other techniques such as placing a drop of test fluid on a sample of the separator material previous wetted by the second phase and thereafter measuring the contact angle. Positive angles are indicative of wetting. Negative angles are indicative of non-wetting.

In any event, it is a key feature of the present invention that a separator be used in an aqueous metal halogen cell which is wet preferentially by aqueous electrolyte and which is substantially not wet by halogen and/or halogen complex in the cell.

A particularly suitable material for use as a separator in the practice of the present invention is the separator material sold under the trade name Hipore by Asahi Chemicals, Tokyo, Japan.

Figure 2:
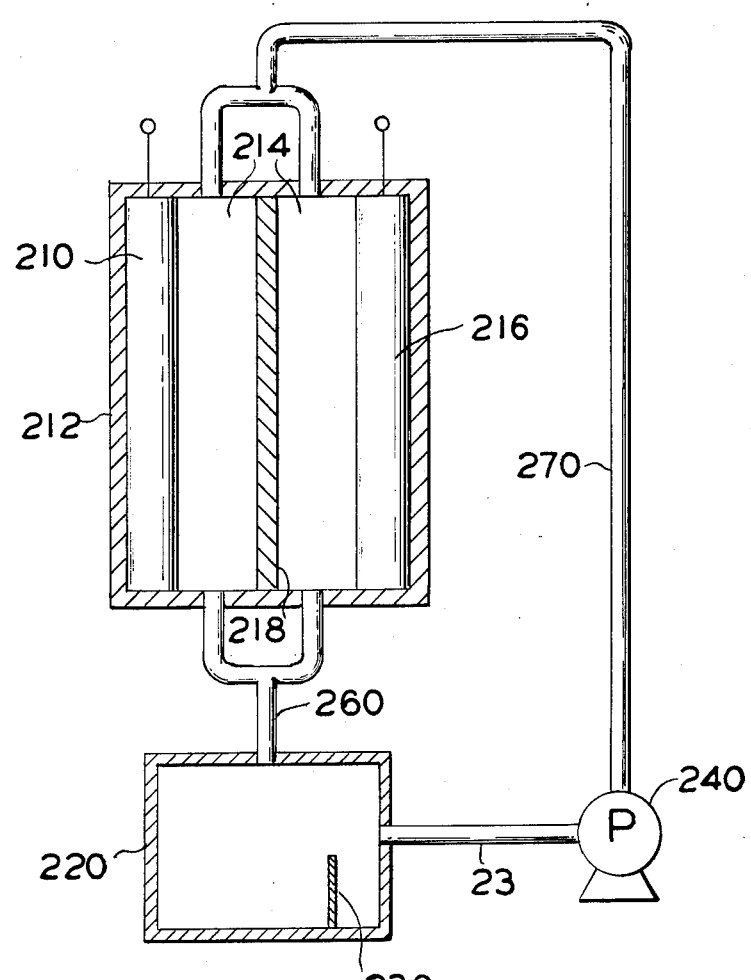
FIG. 2 is a schematic view of another cell in accordance with the present invention.

Turning now to FIG. 2, there is shown another electrochemical cell in which the separator of the present invention is utilized. As is illustrated in FIG. 2, the electrochemical cell has a metal anode 210 disposed in a container or housing 212. Spaced apart from anode 210 and within housing 212 is a chemically non-reactive, inert electrode 216. Inert electrode 216 is disposed within housing 212 so as to define with the enclosing walls of container 212 in electrolyte chamber for electrolyte 214. Additionally, the cell is provided with a separator 218 of the present invention. As can be seen in FIG. 2, communicating with the electrolyte chamber is a separation tank 220 in which a drain or baffle 230 is located. Electrolyte circulating means such as pump 240 is provided to circulate electrolyte 214 through the cell from the storage zone 220 via lines 260 and 270.

Figure 3:
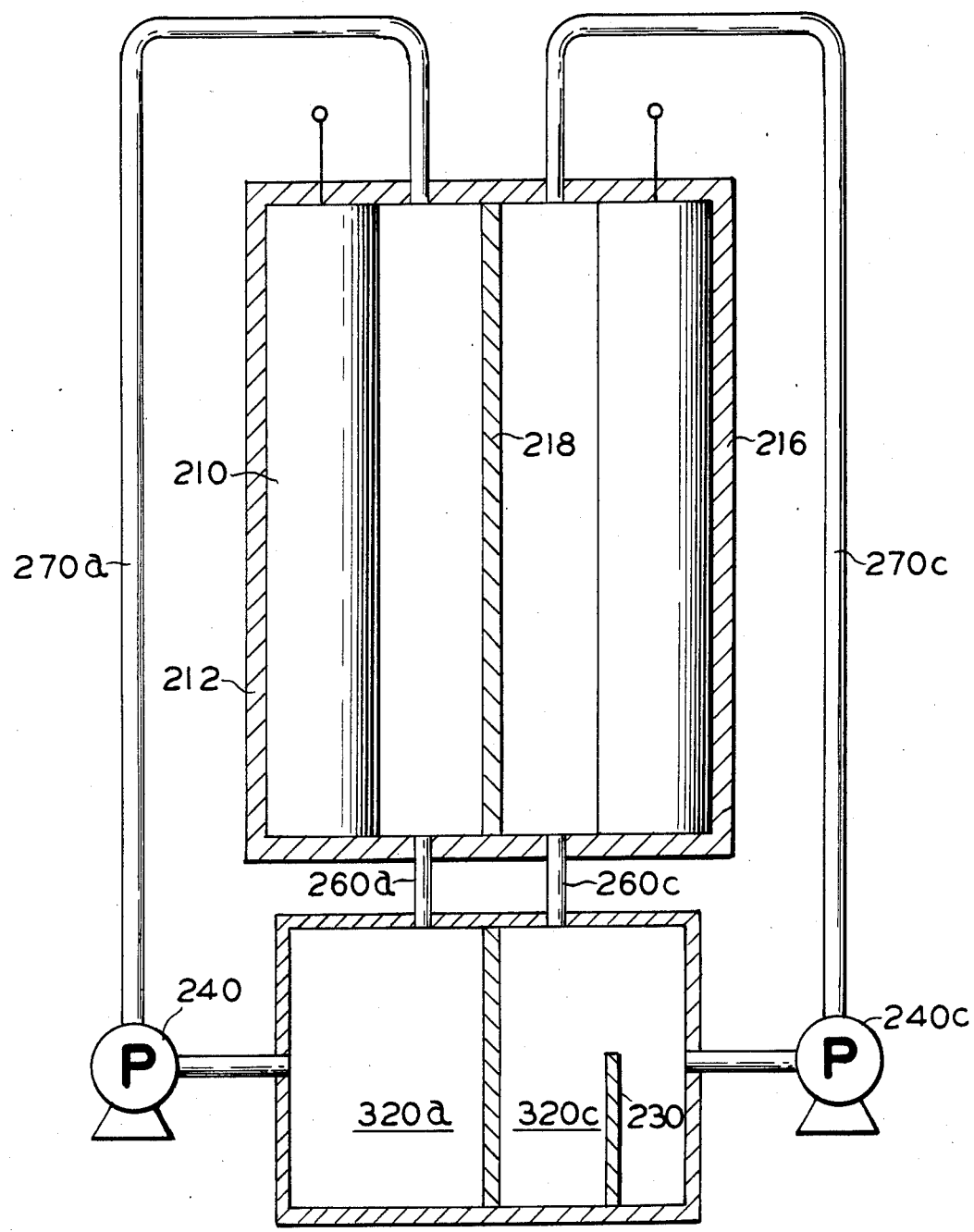
FIG. 3 is a schematic view of yet a particularly embodiment of a cell of the present invention.

The embodiment of FIG. 3 is similar to that of FIG. 2 (and like parts are like-numbered) except that both a separate anolyte storage zone 320a and a separate catholyte storage zone 320c are provided. In this embodiment, pump means 240a and 240c are provided for separately circulating anolyte and catholyte respectively through the cell via lines 260a and 270a and lines 270c and 270c, respectively.

In cell operation, impressing an electric current on the cell containing electrolyte zinc bromide will result in deposition of zinc on the anode and generation of cathodic bromine. In the FIGS. 2 and 3 embodiments, bromine is stored external the cell. Since bromine and the polybromide complexes referred to herein are heavier than the aqueous electrolytes, they can be effectively separated from the aqueous phase. Baffles 230 and 330 help in that separation. During discharge of the cell, the bromine and/or bromine complex is returned to the cell and electric current is withdrawn.

Importantly, cells employing a separator of this invention which is preferentially wet by aqueous electrolyte and substantially not wet by the cathodic halogen display coulombic efficiencies of from about 10 to 30% higher than when the cell employs a separator that is wet by the cathodic halogen. To illustrate the importance of the foregoing, the following examples are provided.

EXAMPLE 1

In this example, a series of commercially available battery separator materials were immersed in a beaker containing an aqueous mixture of 2M $ZnBr_2$, 2M $Br_2$ and 1.12M N-methyl, N-ethyl morpholinium bromide. Since the bromine and the quaternary ammonium salt in the mixture formed a red, second, water immiscible phase, the extent or preferential wetting of the separator by the bromine complex could be visually observed. The results are shown in Table I below.

TABLE I

| Separator Material | Preferential Wetting | | Comments |
|---|---|---|---|
| | $Br_2$ Complex | Aqueous Phase | |
| 1 | Yes | No | Bromine phase wicked up the separator from .5 to 2 cm |
| 2 | Yes | No | Bromine phase wicked up separator from .5 to 1.5 cm |
| 3 | No | Yes | No wicking - Miniscus of bromine phase slopes down |

The separator materials used in the order listed were Daramic, sold by W. R. Grace & Co., Baltimore, Md, Submicro, sold by Evans Products Co., New York, N.Y. and Hipore, sold by Asahi Chemicals, Tokyo, Japan each of which comprise a porous silica phase embedded in a polyolefin binder.

As can be seen from the foregoing, different separator materials are wet differently by the bromine complex and aqueous electrolyte.

EXAMPLE 2

An eight cell, 1 KWH battery, with 1200 cm bipolar electrodes and containing 8 1 of electrolyte was employed in a series of tests, each test using a different separator. In each test the battery was placed on a cycle testing routine consisting of a 3 hour charging and subsequent discharging to an 8V (1 V/cell) cutoff. The ratio of discharge time to charge time was a measure of the coulombic efficiency. The tests were carried out with aqueous electrolytes A and B, the compositions of which are given in Table II below.

TABLE II

| Electrolyte | Composition |
|---|---|
| A | 3 M $ZnBr_2$ |
| | 0.5 M N—methyl, N—ethyl morpholinium bromide |
| | 0.5 M N—methyl, N—ethyl pyrolidinium bromide |
| B | 2 M $ZnBr_2$ |
| | 1 M $ZnCl_2$ |
| | 0.5 M N—methyl, N—ethyl morpholinium bromide |
| | 0.5 M N—methyl, N—ethyl pyrolidinium bromide |

The coulombic efficiency (CE), the voltage efficiency (VE) and the energy efficiency (EE) in each test was determined. The results are summarized in Table III below.

TABLE III

EFFICIENCY VS. SEPARATOR

| Test Conditions | | | | | Results | | |
|---|---|---|---|---|---|---|---|
| Test | Electrolyte | Charge/Discharge Rate | Total Charge | Separator | CE | VE | EE |
| 1 | A | 20 ma/cm$^2$ | 60 mAh/cm$^2$ | Daramic* | 77.6 | 81.2 | 63.0 |
| 2 | A | 20 ma/cm$^2$ | 60 mAh/cm$^2$ | This invention** | 83.5 | 84.4 | 70.4 |
| 3 | A | 20 ma/cm$^2$ | 90 mAh/cm$^2$ | Daramic* | 74.9 | 82.5 | 61.8 |
| 4 | A | 20 ma/cm$^2$ | 90 mAh/cm$^2$ | This invention** | 84.9 | 83.1 | 70.6 |
| 5 | B | 30 ma/cm$^2$ | 90 mAh/cm$^2$ | Daramic* | 80.4 | 76.2 | 61.2 |
| 6 | B | 30 ma/cm$^2$ | 90 mAh/cm$^2$ | This invention** | 89.1 | 79.3 | 70.6 |
| 7 | B | 13 ma/cm$^2$ | 90 mAh/cm$^2$ | Daramic* | 80.4 | 76.2 | 61.2 |
| 8 | B | 13 ma/cm$^2$ | 90 mAh/cm$^2$ | This invention** | 82.5 | 91.4 | 75.4 |

*Daramic is a trade name for a separator material sold by W. R. Grace & Co., Baltimore, Md.
**The separator material used that is preferentially wet by the aqueous phase and not substantially wet by the bromine second phase was Hipore, sold by Asahi Chemicals, Tokyo, Japan.

From the foregoing, it can be seen that use of a separator that is not substantially wet by the bromine phase, in accordance with the invention, results in improved cell efficiency.

What is claimed is:

1. An electrochemical cell having a metal bromine couple, said cell comprising:

an electrode structure on which the metal of the couple is deposited during charging of the cells;

the counterelectrode structure at which cathodic bromine is generated during charging of the cell;

an aqueous electrolyte comprising an aqueous metal bromide solution, the metal being the same as the metal of the metal bromine couple, said aqueous electrolyte containing a water soluble complexing agent capable of forming a water immiscible complex with cathodic bromine; and a microporous separator between said electrode and said counterelectrode structure, said microporous separator being selected from separators which are preferentially wet by aqueous electrolyte and are not wet by the water immiscible complex of cathodic bromine.

2. The cell of claim 1 wherein said separator is selected from the material which when vertically immersed in a container containing aqueous electrolyte and a water immiscible bromine complex, the resultant level of bromine complex in the separator is substantially equal to the level of the bromine complex in the container.

3. The cell of claim 1 wherein separator selected from one which is placed in contact with a water immiscible complex of cathodic bromine to form a negative angle.

4. The cell of claim 1 wherein said metal is zinc.

5. In an electrochemical cell of the type having a zinc bromine couple; an electrode structure on which zinc is deposited during charging of the cell; a counterelectrode structure at which cathodic bromine is generated during charging of the cell; an aqueous zinc bromide electrolyte solution including a water soluble complexing agent capable of forming a water immiscible complex with cathodic bromine; and wherein said cell includes a microporous separator between the electrode and counterelectrode structure, the improvement comprising: selecting as the microporous separator a material which is preferentially wet by aqueous electrolyte and is not wet by the water immiscible complex of cathodic bromine.

6. A method of enhancing the coulombic efficiency of electrochemical cells having microporous separators and employing as the electrolyte an aqueous metal bromide solution containing a water soluble complexing agent capable of forming a water immiscible complex with bromine, said method comprising: using a microporous separator selected from separators which are preferentially wet by aqueous electrolyte and are not wet by said water immiscible bromine complex.

* * * * *